(12) United States Patent
Hong et al.

(10) Patent No.: US 7,180,565 B2
(45) Date of Patent: *Feb. 20, 2007

(54) IN-PLANE SWITCHING MODE LIQUID CRYSTAL DISPLAY DEVICE HAVING A STORAGE ELECTRODE CONNECTED TO THE PIXEL ELECTRODE AND UNDER THE COLOR FILTER

(75) Inventors: Hyung-Ki Hong, Seoul (KR); Jin-Youl Chung, Seoul (KR)

(73) Assignee: LG. Philips Co., Ltd., Seoul (KR)

( * ) Notice: Subject to any disclaimer, the term of this patent is extended or adjusted under 35 U.S.C. 154(b) by 80 days.

This patent is subject to a terminal disclaimer.

(21) Appl. No.: 11/019,244

(22) Filed: Dec. 23, 2004

(65) Prior Publication Data

US 2005/0099571 A1    May 12, 2005

Related U.S. Application Data

(63) Continuation of application No. 10/423,021, filed on Apr. 25, 2003, now Pat. No. 6,839,116.

(30) Foreign Application Priority Data

Oct. 11, 2002    (KR)  ................................ 2002-62144

(51) Int. Cl.
*G02F 1/1343*    (2006.01)

(52) U.S. Cl. .................... 349/141; 349/106; 349/39
(58) Field of Classification Search ................. 349/141, 349/106, 38, 39
See application file for complete search history.

(56) References Cited

U.S. PATENT DOCUMENTS

| | | | |
|---|---|---|---|
| 5,598,285 A | 1/1997 | Kondo et al. | 349/39 |
| 5,745,207 A | 4/1998 | Asada et al. | |
| 5,805,247 A | 9/1998 | Oh-e et al. | |

(Continued)

FOREIGN PATENT DOCUMENTS

JP    9005764    1/1997

(Continued)

OTHER PUBLICATIONS

Lee et al., "High-Transmittance, Wide-Viewing-Angle Nematic Liquid Crystal Display Controlled by Fringe-Field Switching", Asia Display '98, pp. 371-374.

(Continued)

*Primary Examiner*—Andrew Schechter
*Assistant Examiner*—Lucy Chien
(74) *Attorney, Agent, or Firm*—McKenna Long & Aldridge LLP

(57) ABSTRACT

An in-plane switching mode liquid crystal display device including a first substrate and a second substrate, data lines and gate lines arranged in a matrix form on the first substrate to define a pixel, a thin film transistor at a cross portion of the gate and data lines, a black matrix over the gate lines, data lines, and the thin film transistor, a color filter layer in the pixel, at least a pair of a common electrode and a pixel electrode over the color filter layer and a liquid crystal layer between the first and second substrates.

18 Claims, 6 Drawing Sheets

U.S. PATENT DOCUMENTS

| | | | |
|---|---|---|---|
| 5,831,701 A | 11/1998 | Matsuyama et al. | |
| 5,838,037 A | 11/1998 | Masutani et al. | 257/296 |
| 5,946,060 A | 8/1999 | Nishiki et al. | 349/48 |
| 5,990,987 A | 11/1999 | Tanaka | 349/43 |
| 6,028,653 A | 2/2000 | Nishida | 349/141 |
| 6,040,887 A | 3/2000 | Matsuyama et al. | |
| 6,097,454 A | 8/2000 | Zhang et al. | 349/43 |
| 6,198,520 B1 | 3/2001 | Kondo et al. | |
| 6,266,166 B1 | 7/2001 | Katsumata et al. | 359/3 |
| 6,507,382 B1 | 1/2003 | Sakamoto et al. | |
| 6,590,627 B2 | 7/2003 | Tomioka et al. | |
| 2003/0063249 A1* | 4/2003 | Hoshino et al. | 349/149 |

FOREIGN PATENT DOCUMENTS

| | | |
|---|---|---|
| JP | 9073101 | 3/1997 |
| JP | 200089240 A | 4/2000 |
| JP | 2000111957 A | 4/2000 |
| JP | 2000-292801 | 10/2000 |
| JP | 2000292801 A | 10/2000 |
| JP | 2001066617 A | 3/2001 |

OTHER PUBLICATIONS

Matsumoto et al., "LP-A: Display Characteristics of In-Plane-Switching (IPS) LCDs and a Wide-Viewing-Angle 14.5in. IPS TFT-LCD", Euro Display '96, pp. 445-448.

Wakemoto et al., "An Advanced In-Plane-Switching Mode TFT-LCD", SID '97 Digest, pp. 929-932.

Kiefer et al., "P2-30 In-Plane Switchiing of Nematic Liquid Crystals", Japan Display '92, pp. 547-550.

Ohta et al., "S30-2 Development of Super-TFT-LCDs with In-Plane Switching Display Mode", Asia Display '95, pp. 707-710.

Oh-e et al., "S23-1 Principles and Characteristics of Electro-Optical Behaviour with In-Plane Switching Mode", Asia Display '95, pp. 577-580.

S. Endoh et al., "Diagonal Super-TFT-LCDs with Meta Wide Viewing Angle and Fast Response Speed of 20ms". IDW '99, pp. 187-190.

Communication from Chinese Patent Office dated Jul. 29, 2005.

* cited by examiner

IN-PLANE SWITCHING MODE LIQUID CRYSTAL DISPLAY DEVICE HAVING A STORAGE ELECTRODE CONNECTED TO THE PIXEL ELECTRODE AND UNDER THE COLOR FILTER

This application is a Continuation of U.S. patent application Ser. No. 10/423,021 filed on Apr. 25, 2003 now U.S. Pat. No. 6,839,116 and claims the benefit of Korean Application No. 2002-62144 filed in Korea on Oct. 11, 2002, which is hereby incorporated by reference in its entirety.

BACKGROUND OF THE INVENTION

1. Field of the Invention

The present invention relates to a liquid crystal display (LCD) device, and particularly, to an in-plane switching mode LCD device and a fabrication method thereof by which aperture ratio and the reliability of image quality can be improved.

2. Description of the Related Art

An LCD device of twisted nematic mode, which is mainly used in flat panel display devices having high image quality and low power consumption, has a narrow viewing angle. The refractive anisotropy of liquid crystal molecules together with the vertical orientation of the liquid crystal molecules with respect to the substrate when voltage is applied to a twisted nematic mode LCD device causes a narrow viewing angle. In contrast, an in-plane switching mode LCD has a wide viewing angle since the liquid crystal molecules are oriented in a direction parallel to the substrate when voltage is applied to an in-plane switching mode LCD device.

FIG. 1A is a plan view showing a pixel of a related art in-plane switching mode LCD. FIG. 1B is a cross-sectional view along line I–I' in FIG. 1A. As shown in FIG. 1A, gate lines 1 and data lines 3 are respectively arranged in longitudinal and transverse directions on a transparent first substrate 10 to define a pixel. In an LCD device with a panel having pixels, n gate lines 1 and m data lines 3 are crossed to make a panel having n×m pixels.

In the pixel, a thin film transistor 9 is formed adjacent to an intersection where one of the gate lines 1 and one of the date lines 3 cross over each other. The thin film transistor 9 includes a gate electrode 1a, source electrode 2a and drain electrode 2b that are respectively connected to the gate line 1, to the data line 3 and to the pixel electrode 7. A gate insulating layer 8 is formed above the gate electrode 1a. A semiconductor layer 5 is formed above the gate insulating layer 8. The source electrode 2a and drain electrode 2b are respectively formed in contact with an end of the semiconductor layer 5.

As shown in FIG. 1A, a common line 4 traverse across the pixel and is in parallel with the gate line 1. A pixel electrode line 14 overlaps the common line 4 as the common line 4 traverse across the pixel. Common electrodes 6, which branch from the common line 4, and pixel electrodes 7, which branch from the pixel electrode line 14, are arranged to be in parallel with each other for switching the liquid crystal molecules. The common electrodes 6 are formed simultaneously with the gate electrode 1a. The pixel electrode 7 is formed simultaneously with the both source electrode 2a and drain electrode 2b such that the pixel electrode 7 is connected to the drain electrode 2b of the thin film transistor 9. In addition, a passivation layer 11 and then a first alignment layer 12a are formed over the first substrate 10 including the source/drain electrodes 2a and 2b.

As shown in FIG. 1B, the common electrodes 6 are formed adjacent to the periphery of the pixel to shield the pixel electrode from a lateral electric field generated by the data lines 3 formed on the periphery of the pixel. The pixel electrode line 14 overlaps the common line 4 with a gate insulating layer 8 therebetween to form a storage capacitor. A black matrix 21 for preventing light from leaking between pixels is formed on the surface of a second substrate 20 facing the first substrate 10. The black matrix 21 covers the thin film transistor 9, the gate lines 1, the data lines 3, and the common electrodes 6 adjacent to the data lines 3 on the first substrate 10. In addition, a color filter 23 with a second alignment layer 12b thereon is also formed on the surface of a second substrate 20 facing the first substrate 10. A liquid crystal layer 13 is formed between the first substrate 10 and the second substrate 20.

When a voltage is not applied to an in-plane switching mode LCD device as shown in FIGS. 1A and 1B, the liquid crystal molecules in the liquid crystal layer 13 are oriented corresponding to the alignment direction of the first alignment layer 12a and the second alignment layer 12b. However, when a voltage is applied between the common electrodes 6 and the pixel electrodes 7, the liquid crystal molecules are reoriented to be in parallel with the substrate and vertical to the extended direction of the common electrodes 6 and the data lines 3.

The liquid crystal molecules in the liquid crystal layer 13 is always reoriented on the same plane. Accordingly, gray level inversion does not appear to be generated when the panel of the LCD device is viewed from above, below, left or right of the LCD panel at an off angle to normal of the LCD panel. However, in the in-plane switching mode LCD device having the structure shown in FIGS. 1A and 1B, in which the black matrix 21 of the second substrate 20 covers the thin film transistor 9, the gate lines 1, the data lines 3, and the common electrodes 6 adjacent to the data lines 3 on the first substrate 10, light leakage may be generated due to a misalignment between the first substrate 10 and the second substrate 20. Thus, the width of the black matrix 21 has to be formed wider than the widths of the thin film transistor 9, the gate lines 1 and the data lines 3 to maintain misalignment error margin. As the width of the black matrix 21 is increased, the aperture ratio of the unit pixel is reduced. A decrease in the aperture ratio can reduce the resolution and brightness of the image displayed on the LCD panel of an LCD device.

SUMMARY OF THE INVENTION

Accordingly, the present invention is directed to an in-plane switching mode LCD device and fabrication method thereof that substantially obviate one or more of the problems due to limitations and disadvantages of the related art.

An object of the present invention is to prevent light leakage due to misalignment of the first and second substrates in an in-line switching mode LCD device.

Another object is to improve the aperture ratio of a pixel in an in-plane switching mode LCD device.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve the objects of the present invention, as embodied and broadly described herein, there is provided an in-plane switching mode liquid crystal display device including: a first substrate and a second substrate; data lines and gate lines arranged in a matrix form on the first substrate to define a pixel; a thin film transistor at a cross portion of the gate and data lines; a black matrix over the gate lines, data lines, and the thin film transistor; a color filter layer in the pixel; at least a pair of a common electrode and a pixel electrode over the color filter layer; and a liquid crystal layer between the first and second substrates.

In another aspect of the present invention, there is provided an in-plane switching mode liquid crystal display device includes a first substrate and a second substrate, the first substrate including: data lines and gate lines arranged in a matrix form on the first substrate to define a pixel; a thin film transistor at a cross portion of the gate and data lines, the thin film transistor including a gate electrode, a semiconductor layer, a source electrode and a drain electrode; a black matrix over the gate lines, data lines, and the thin film transistor; a color filter layer in the pixel; an overcoat layer over the color filter layer; and at least a pair of a common electrode and a pixel electrode on the overcoat layer.

In another aspect of the present invention, there is provided a fabrication method of an in-plane switching mode LCD device including: forming a gate electrode on a first substrate; forming a semiconductor layer on the gate electrode; forming a source electrode and a drain electrode on the semiconductor layer; forming a passivation layer on the first substrate; forming a black matrix above the passivation layer; forming a color filter layer above the passivation layer; and forming a pixel electrode and a common electrode over the color filter layer.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

DETAILED DESCRIPTION OF THE EXEMPLARY EMBODIMENTS

Reference will now be made in detail to the exemplary embodiments of the present invention, examples of which are illustrated in the accompanying drawings.

Figure 2A:
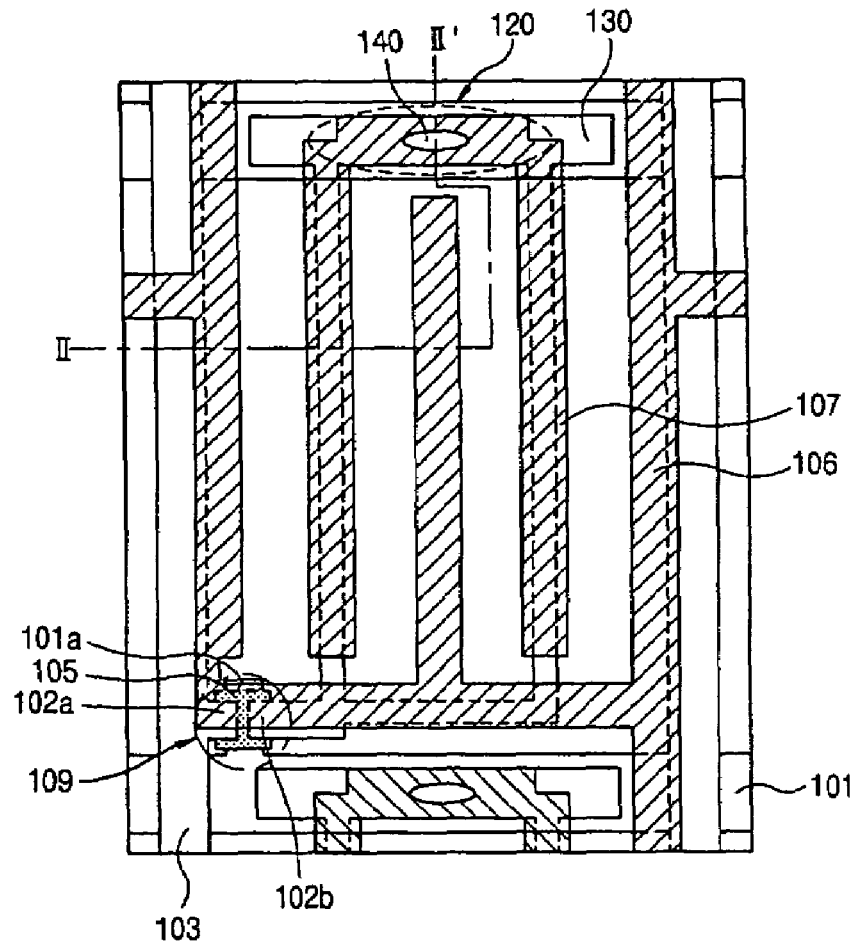
FIG. 2 is a view showing a unit pixel of an in-plane switching mode LCD device according to a first exemplary embodiment of the present invention.
FIG. 2B is a cross-sectional view along line II–II' in FIG. 2A.
Figure 2B:
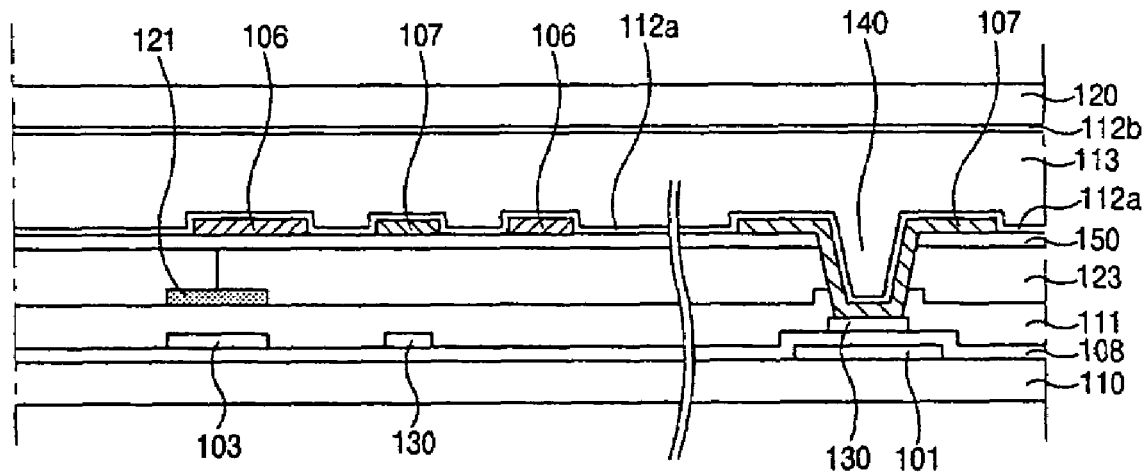

FIG. 2 is a plan view showing a pixel of an in-plane switching mode LCD device according to a first exemplary embodiment of the present invention. FIG. 2B is a cross-sectional view along line II–II' in FIG. 2A. As shown in FIG. 2A, gate lines 101 and data lines 103 are respectively arranged in longitudinal and transverse directions to define a pixel. Common electrodes 106 and pixel electrodes 107 are positioned in parallel with the data lines 103. The pixel electrodes 107 are positioned in between the common electrodes 106 with a predetermined gap between each of the common electrodes 106 and each of the pixel electrodes 107 in the pixel. A thin film transistor 109 is disposed in the pixel adjacent to where one of the gate lines 101 and one of the data lines 103 cross each other. The thin film transistor 109 comprises a gate electrode 101a connected to the gate line 101, a semiconductor layer 105 formed on the gate electrode 101a, a source electrode 102a formed on the semiconductor layer 105 and connected to the data line 103, and a drain electrode 102b facing the source electrode 102a and connected to the pixel electrode 107.

The pixel electrode 107 overlaps with one of the gate lines 101 that is not connected to the thin film transistor 109 of the pixel. Storage electrode 130 that is connected to the drain electrode 102b of the thin film transistor 109 is disposed between the common electrodes 106 and overlaps the one of the gate lines 101 that is not connected to the thin film transistor 109 of the pixel. The storage electrode 130 and the pixel electrode 107 are connected through a contact hole 140 above the one of the gate lines 101 that is not connected to the thin film transistor 109 of the pixel. A portion of the storage electrode 130 overlapping the one of the gate lines 101 that is not connected to the thin film transistor 109 of the pixel with a gate insulating layer 108 therebetween forms a storage capacitor.

As shown in FIG. 2B, the gate lines 101 are formed on a transparent first substrate 110, and the storage electrode 130 and the data lines 103 are formed on the gate insulating layer 108. In addition, a passivation layer 111 is formed over the entire surface of the substrate including the storage electrode 130 and the data line 103. A black matrix 121 is formed over an area corresponding to the gate line 101 and the data line 103 to prevent light from leaking between pixels. A color filter layer 123 is formed on the black matrix 121 corresponding to the pixel. In the alternative, the color filter layer 123 may be formed on the passivation layer 111 prior to the formation of the black matrix 121. An overcoat layer 150 for flattening the color filter layer 123 is formed on the color filter layer 123. The common electrodes 106 and the pixel electrodes 107, which are disposed alternately with a certain predetermined gap therebetween, are formed on the overcoat layer 150. One of the common electrodes 106 overlaps with the data lines 103 at the peripheral sides of the pixel. In addition, a first alignment layer 112a is formed over the common electrode 106 and the pixel electrode 107. A second alignment layer 112b is formed on the second substrate 120, and a liquid crystal layer 113 is formed between the first and second substrates 110 and 120.

In the LCD device having the structure shown in FIGS. 2A and 2B, the data lines 103 and the common electrodes 106 adjacent to the data lines 103 are formed to be overlapped with each other, and thereby, the aperture ratio can be improved. Also, the pixel electrodes 107 are formed on the overcoat layer 150 that is on the same plane on which the common electrode 106 is formed. Because the pixel and common electrodes 107 and 106 are formed on the same plane, a desirable lateral electric field is generated parallel to the surface of the substrate when a voltage is applied between the pixel and common electrodes 107 and 106. Therefore, the viewing angle is further improved. Moreover, when it is compared to the related art, the electric field between the two electrodes is directly applied to the liquid crystal layer without passing through the passivation layer, and therefore, stronger electric fields can be generated. The liquid crystal molecules in the liquid crystal layer can be switched more rapidly due to a stronger electric field, and therefore, moving pictures can be more readily realized.

Also, since the color filter layer 123 is formed on the same substrate as that of the thin film transistor 109, misalignment between the color filter layer and the corresponding pixel is not generated when the upper substrate 120 and the lower substrate 110 are attached. Therefore, attaching margin with the black matrix 121 which blocks the light can be reduced, and the aperture ratio can be improved.

Figure 1A:
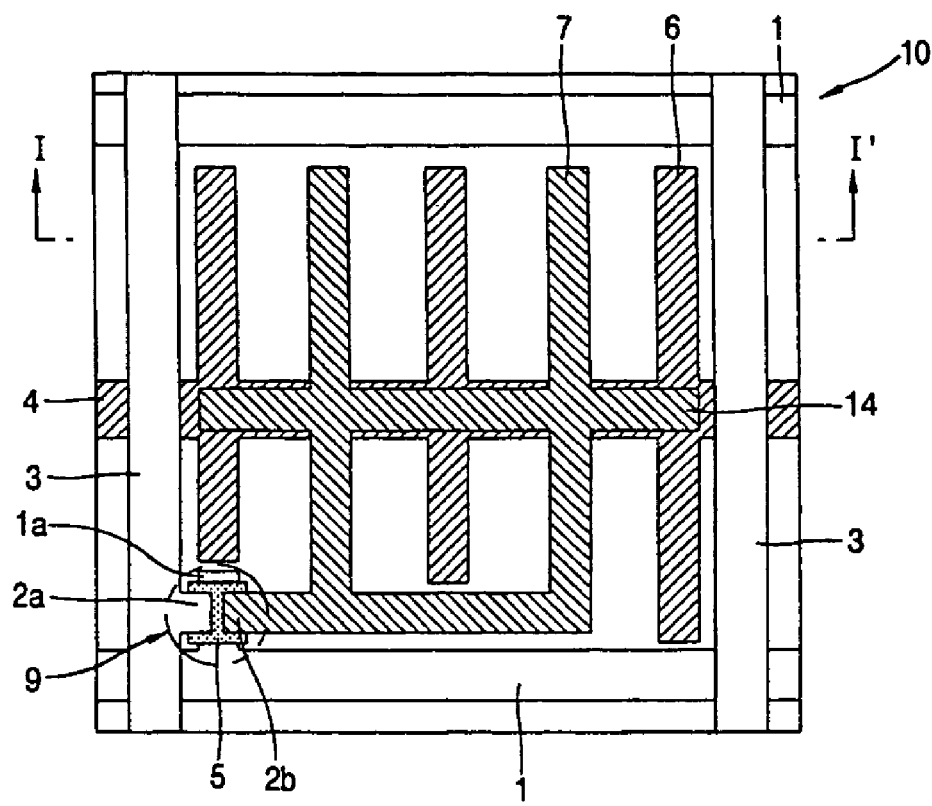
FIGS. 1A and 1B are views showing structure of a related art in-plane switching mode LCD device.
Figure 1B:
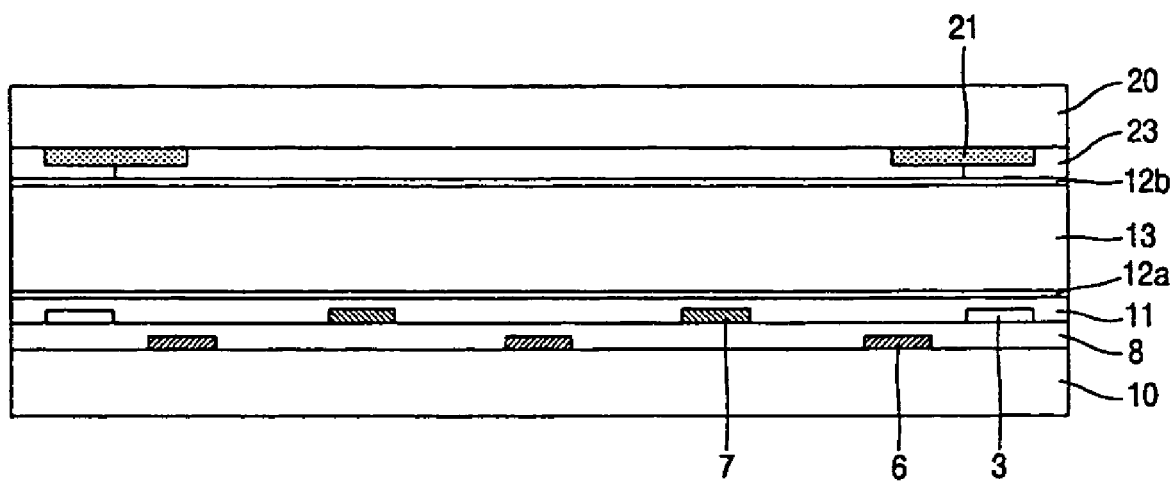

In more detail, as shown in FIG. 1B, since the color filter 23 and the thin film transistor 9 are formed on different planes from each other according to the related art, respective R, G and B color filters should be corresponded to one pixel when the upper substrate 20 on which the color filter layer 23 is formed and the lower substrate 10 on which the black matrix 21 is formed are attached. In case that these are mis-aligned, inferiority such as light leakage and color interruption between pixels can be generated. Therefore, in order to prevent the inferiority, the width of the black matrix on the upper substrate should be formed to be wide, and thereby, the aperture ratio is reduced.

On the contrary, according to the present invention, since the color filter 123 is formed on essentially the same plane as that of the thin film transistor 109, the attaching margin for preventing the misalignment is not needed, and thereby, the width of the black matrix 121 can be reduced less than that of the related art.

Figure 3:
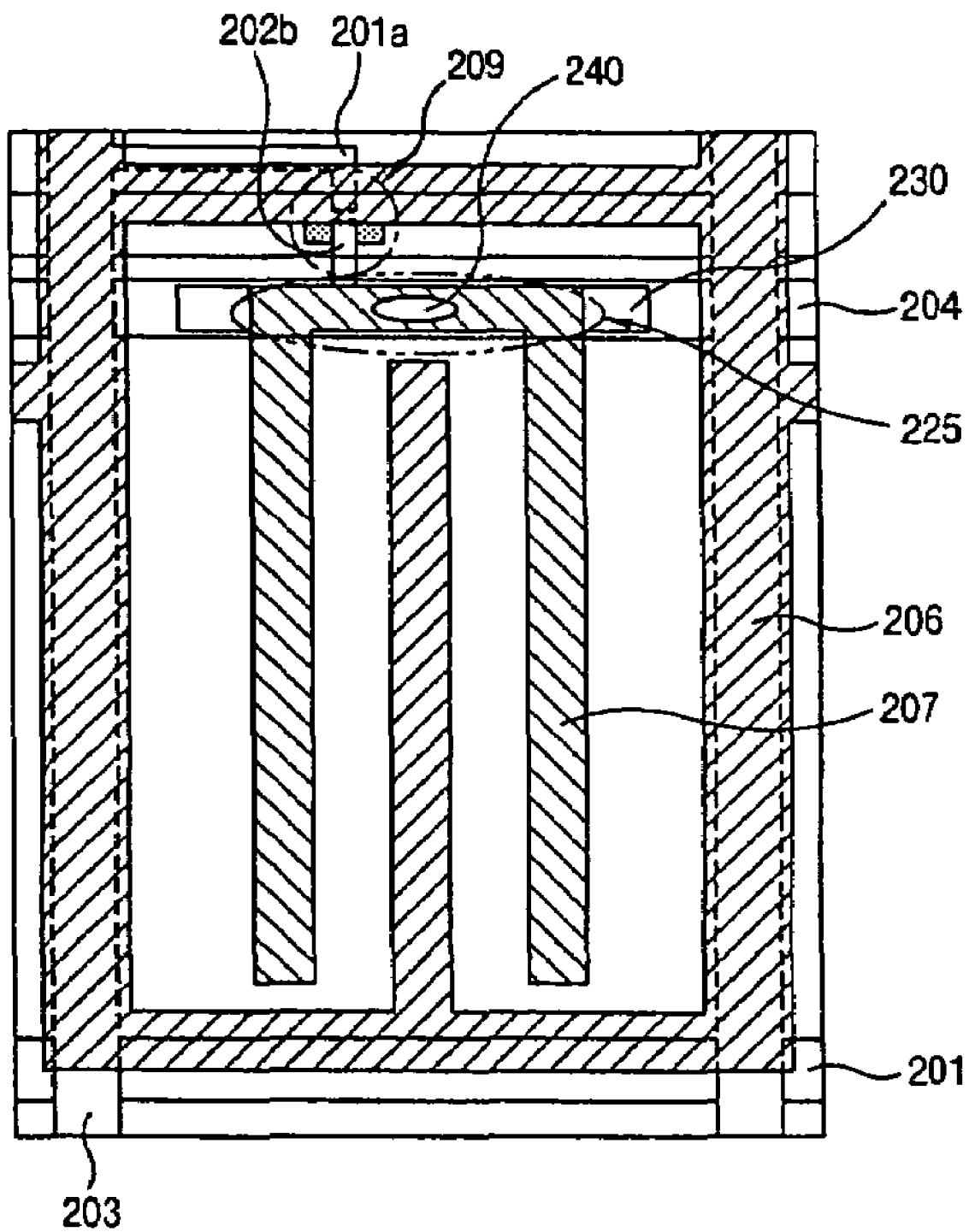
FIG. 3 is a view showing an in-plane switching mode LCD device according to a second exemplary embodiment of the present invention.

FIG. 3 is a plane view showing an in-plane switching mode LCD device having a storage on a common structure according to a second exemplary embodiment of the present invention. A difference between the first exemplary embodiment and the second exemplary embodiment is with regard to the storage capacitor formed by a common line 204 and a storage electrode 230 formed thereon in the present embodiment. That is, as shown in FIG. 3A, a portion 201a of the gate line 201 is disposed to be in parallel with the common line 204. The portion 201a of the gate line 201 connects to the gate electrode of a thin film transistor 209. The storage electrode 230, which is connected to a drain electrode 202b of the thin film transistor 209, is disposed to overlap the common line 204, and therefore forms an overlapped region 225 that is a storage capacitor. Pixel electrodes 207 is also disposed on the same plane as the common electrodes 206. Some of the common electrodes 206 are disposed on the periphery of the pixel over the data lines 203 to increase the aperture ratio. In addition, the pixel electrodes 207 are connected to the storage electrode 230 through a contact hole 240. Because the storage electrode 230 is connected to the drain electrode 202b, an additional contact hole for connecting the drain electrode 202b and the pixel electrode 207 is not necessary.

Figure 4A:
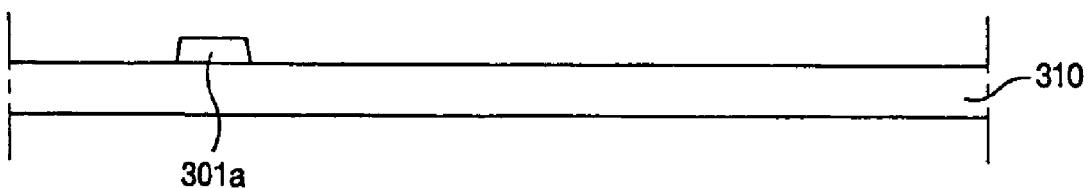
FIGS. 4A through 4G are processing views illustrating a fabrication method of the in-plane switching mode LCD device according to the second exemplary embodiment of the present invention.

FIGS. 4A through 4G are processing views illustrating the fabrication method of a pixel for an in-plane switching mode LCD device according to an exemplary embodiment of the present invention. As shown in FIG. 4A, after providing a transparent insulating substrate 310, such as glass, a metal, such as Cr, Ti, Cr, Al, Mo, Ta and Al alloy, is deposited on the substrate 310 using a sputtering method and patterned to form a gate electrode 301a. Gate lines connected to the gate electrode 301a are also formed with the gate electrode 301a. In the case that the common lines 204 may also be formed with the gate lines and gate electrode 301a, as shown in FIG. 3, the common lines 204 may also be formed.

Figure 4B:

Next, as shown in FIG. 4B, SiNx or SiOx is deposited on the entire substrate 310 using, for example, a plasma CVD method to form a gate insulating layer 308. Then, amorphous silicon 305a and $n^+$ amorphous silicon 305b are deposited and patterned on the upper part thereof to form a semiconductor layer 305. The semiconductor layer 305 is also formed on an area in which the data line will be formed to supply a data signal through the semiconductor layer 305 if an open occurs in the data line due to the inferiority of processing when forming the data line.

Figure 4C:
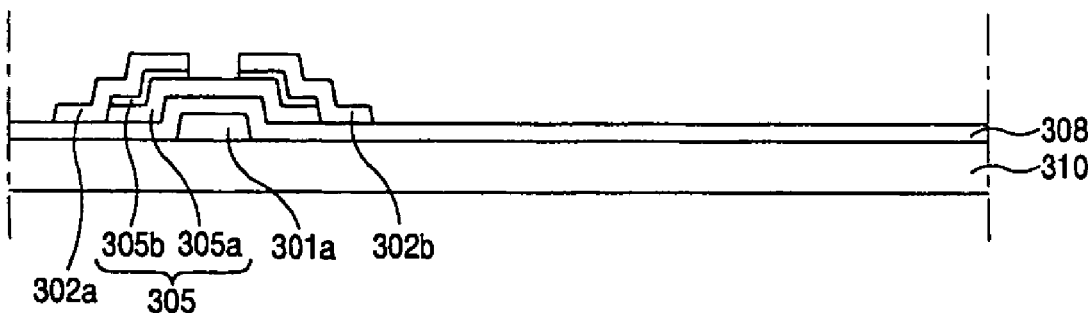

Next, as shown in FIG. 4C, a metal, such as Cu, Mo, Ta, Al, Cr, Ti and Al alloy, is deposited using, for example, a sputtering method and patterned to form a source electrode 302a and a drain electrode 302b on the semiconductor layer 305. In addition, a part of the semiconductor layer which is formed by the $n^+$ amorphous silicon is removed to form an ohmic contact layer 305b so as to insulate the source electrode 302a and the drain electrode 302b. The storage electrode connected to the drain electrode 302b that overlaps with the gate line may be formed with the drain electrode 302b. Further, the common line may be formed with the storage electrode.

Figure 4D:
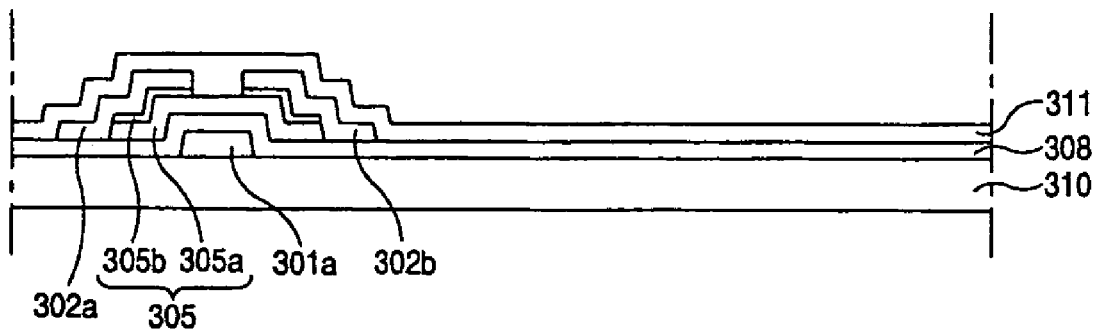
Figure 4E:
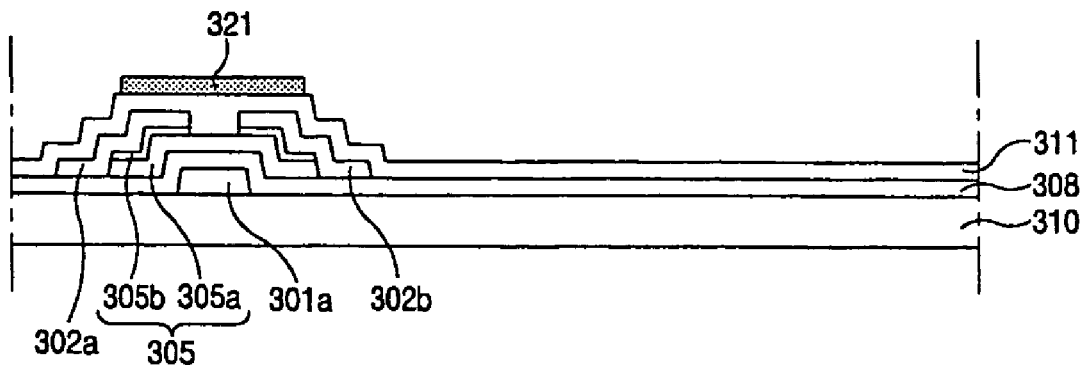

As shown in FIG. 4D, an inorganic material, such as SiOx or SiNx, or an organic material such as BCB (benzocyclobutene) or acryl, is deposited over the source and drain electrodes 302a and 302b including the semiconductor layer 305 and over the entire upper surface of the gate insulating layer 308 to form a passivation layer 311. Then, as shown in FIG. 4E, an opaque metal material, such as Cr, is deposited on the passivation layer 311 and patterned to form a black matrix 321. The black matrix is formed over the gate lines, the data lines, and the thin film transistor. The black matrix may be formed of resin.

Figure 4F:
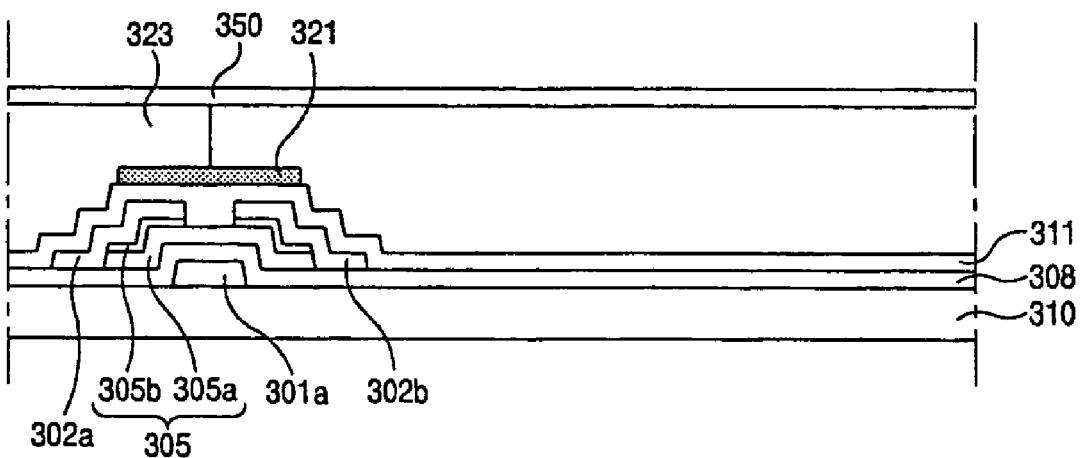

As shown in FIG. 4F, a color pigment is deposited on the black matrix 321 and the passivation layer 311 and patterned to form the color filter layer 323 of an appropriate one of red R, green G and blue B colors. In the alternative, the color filter layer 323 may be formed on the passivation layer 311 prior to the formation of the black matrix 321. The color filter layer 323 is formed to correspond to the respective pixels. To form each of the R, G and B color filters, three deposition and three patterning processes are required. In addition, an overcoat layer 350 may be formed on the color filters for flattening the color filters, and a contact hole for exposing a part of the storage electrode is formed, as shown in FIG. 2B.

Figure 4G:
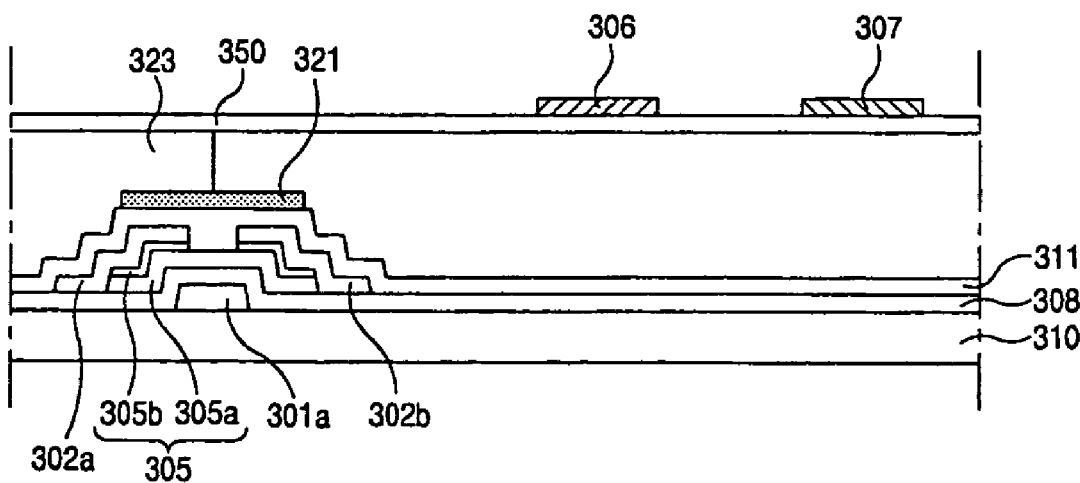

As shown in FIG. 4G a metal, such as Cr, Ti, Cr, Al, Mo, Ta and Al alloy are deposited over the overcoat layer 350 using, for example, a sputtering method and patterned to form the common electrodes 306 and the pixel electrodes 307. The common electrodes 306 and the pixel electrodes 307 are formed to be in parallel with the data lines, for example. The pixel electrodes 307 are formed to be connected with the storage electrode through the contact hole. The common electrodes 306 and the pixel electrodes 307 may be formed using an opaque metal. However, they also may be formed using a transparent conductive material, such as Indium Tin Oxide (ITO) or Indium Zinc Oxide (IZO).

Figure 5A:
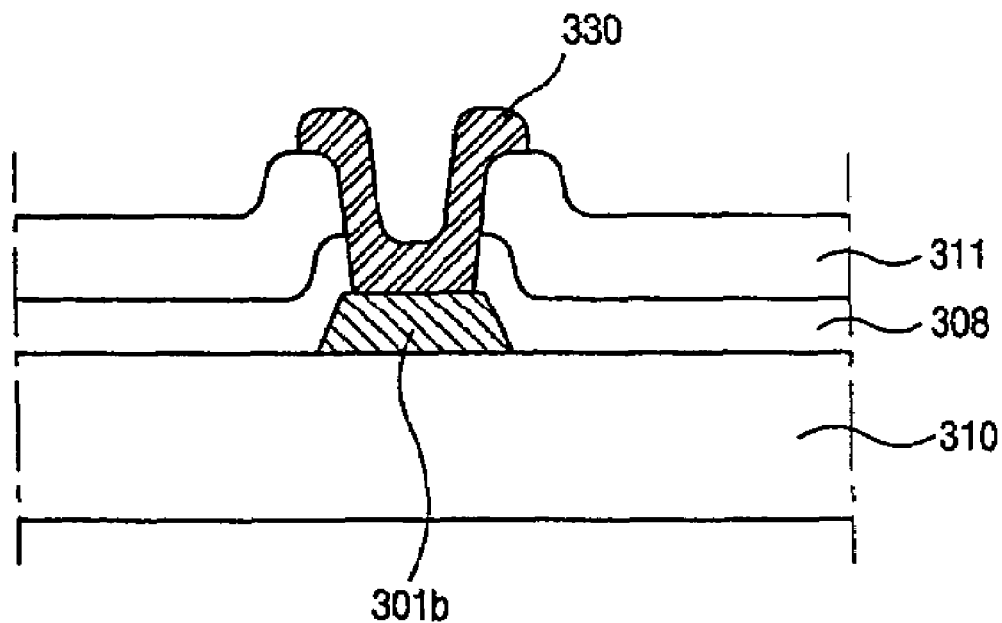
FIGS. 5A and 5B are cross-sectional views showing a pad area connecting a gate line and a data line to outer driving circuits.
Figure 5B:
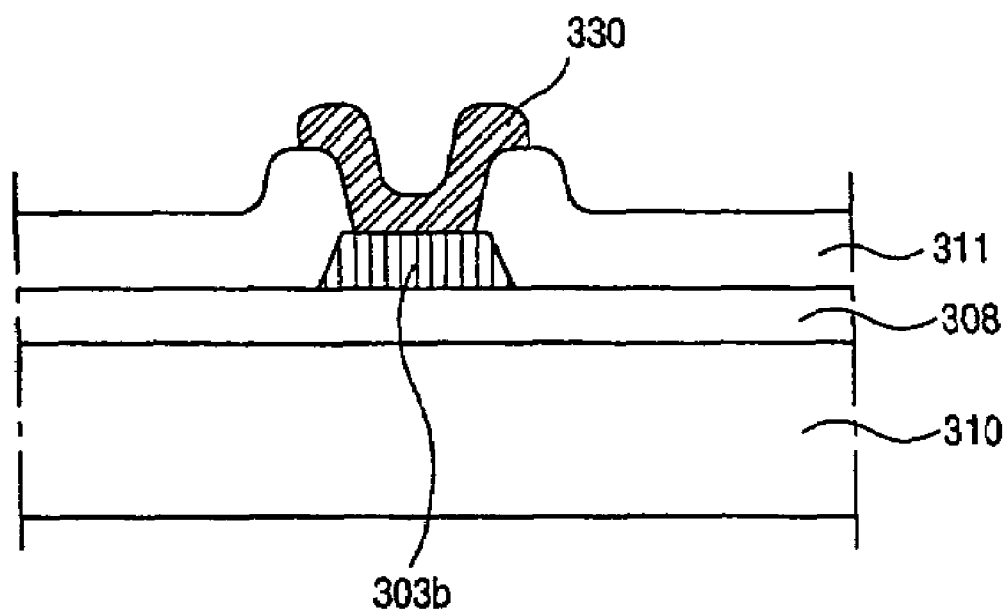

Although it is not shown in FIGS. 4A–4G, a contact process of gate/data pad units to gate/data driver integrated circuits is made simultaneously with the deposition and patterning of the common electrodes 306 and the pixel electrodes 307. Therefore, when the two electrodes 306 and 307 are formed from an ITO or IZO, additional metallization processes are not required for connecting gate/data pad units to gate/data driver integrated circuits. More specifically, the gate pad 301b is formed with the gate lines and the gate electrode 301a on the first substrate 310, and the data pad 303b is formed with the data lines and the source/drain electrodes 302a and 302b on the gate insulating layer 308, as shown in FIGS. 5A and 5B. The passivation layer 311 on the pads 301b and 303b is etched to expose the pads 301b and 303b so that the pads may be connected to an outer driving circuit (not shown). When the pads 301b and 303b are exposed to air, an oxidation layer is formed on the surface of the pads 301b and 303b, and causes inferior contacting to the outer driving circuits. Therefore, as shown in FIGS. 5A and 5B, when a metal layer 330 made of ITO or IZO is formed on the pads 301b and 303b, the oxidation of the pads can be prevented. Thus, when the common electrodes 306 and the pixel electrodes 307 are made of these materials, the metal layer 330 may be formed simultaneously.

As described above, the color filter layer is formed on the same plane as that of the thin film transistor according to the present invention, and thereby, the misalignment between the upper substrate and the lower substrate can be prevented and the aperture ratio can be improved. The LCD device having the above structure includes the black matrix on the first substrate, and therefore, the first and second substrates may be attached without the concern of an alignment margin for the black matrix. Thus, the width of the black matrix can be reduced such that the aperture ratio can be improved. Also, the common electrodes and the pixel electrodes are formed on the overcoat layer such that a desirable strong electric field is generated in parallel with the surface of the substrate to switch the liquid crystal layer while maintaining a wide viewing angle.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A fabrication method of an in-plane switching mode liquid crystal display device, comprising:
    forming data lines and gate lines arranged in a matrix form on a first substrate to define a pixel;
    forming a thin film transistor at a cross portion of the gate and data lines;
    forming a black matrix over the gate lines, data lines, and the thin film transistor; forming a color filter layer in the pixel;
    forming at least a pair of a common electrode and a pixel electrode over the color filter layer;
    forming a storage electrode under the color filter layer, the storage electrode is connected to the pixel electrode; and
    forming a liquid crystal layer on the first substrate.

2. The method of claim 1, wherein forming the thin film transistor includes:
    forming a gate electrode;
    forming a gate insulating layer on the gate electrode;
    forming a semiconductor layer on the gate insulating layer; and
    forming a source electrode and a drain electrode on the semiconductor layer.

3. The method of claim 1, wherein the storage electrode overlaps one of the gate lines, the storage electrode being on the gate insulating layer.

4. The method of claim 1, further comprising forming an overcoat layer on the color filter layer.

5. The method of claim 1, further comprising forming a common line in parallel with the gate lines.

6. The method of claim 5, wherein the storage electrode overlaps the common line.

7. The method of claim 5, wherein a first portion of the common electrode overlaps the data lines.

8. The method of claim 7, wherein a second portion of the common electrode overlaps one of the gate lines and the thin film transistor.

9. The method of claim 8, wherein a third portion of the common electrode overlaps another one of the gate lines.

10. The method of claim 1, wherein pixel electrodes are formed between common electrodes with a predetermined gap between each of the common electrodes and each of the pixel electrodes.

11. The method of claim 1, further comprising forming a gate pad and a data pad on the first substrate.

12. The method of claim 11, wherein the gate pad and data pad include one of Indium Tin Oxide (ITO) and Indium Zinc Oxide (IZO).

13. The method of claim 10, wherein the pixel electrodes are formed of one of Indium Tin Oxide (ITO) and Indium Zinc Oxide (IZO).

14. The method of claim 1, further comprising first and second alignment layers on the first and second substrates.

15. A fabrication method of an in-plane switching mode liquid crystal display device comprising:
    forming data lines and gate lines arranged in a matrix form on a first substrate to define a pixel;
    forming a thin film transistor at a cross portion of the gate and data lines, the thin film transistor including a gate electrode, a semiconductor layer, a source electrode and a drain electrode;
    forming a black matrix over the gate lines, data lines, and the thin film transistor;
    forming a color filter layer in the pixel;
    forming a storage electrode positioned under the color filter layer, the storage electrode is connected to the drain electrode and the pixel electrode;
    forming an overcoat layer over the color filter layer;
    forming at least a pair of a common electrode and a pixel electrode on the overcoat layer; and
    attaching the first substrate and a second substrate.

16. The method of claim 15, further comprising forming a first alignment layer on the first substrate.

17. The method of claim 15, further comprising forming a second alignment layer on the second substrate.

18. The method of claim 15, further comprising forming a liquid crystal layer between the first and second substrates.

* * * * *